(12) United States Patent
Colasante

(10) Patent No.: US 11,415,118 B1
(45) Date of Patent: Aug. 16, 2022

(54) APPARATUS, SYSTEM AND METHOD FOR GENERATING IONOSONIC LIFT

(71) Applicant: David A. Colasante, Newtown Square, PA (US)

(72) Inventor: David A. Colasante, Newtown Square, PA (US)

( * ) Notice: Subject to any disclaimer, the term of this patent is extended or adjusted under 35 U.S.C. 154(b) by 303 days.

(21) Appl. No.: 16/700,768

(22) Filed: Dec. 2, 2019

(51) Int. Cl.
*F03H 1/00* (2006.01)
*B64G 1/40* (2006.01)

(52) U.S. Cl.
CPC .......... *F03H 1/0043* (2013.01); *B64G 1/405* (2013.01); *F03H 1/0018* (2013.01)

(58) Field of Classification Search
CPC ...... F03H 1/0018; F03H 1/0043; B64G 1/405
See application file for complete search history.

(56) References Cited

U.S. PATENT DOCUMENTS

| 3,130,945 | A | 4/1964 | De Seversky |
| 10,119,527 | B2 | 11/2018 | Krauss |
| 2010/0133386 | A1* | 6/2010 | Schwimley ............... F15D 1/12 244/205 |

FOREIGN PATENT DOCUMENTS

WO 2008016928 A1 2/2008

OTHER PUBLICATIONS

Research Letter, Nature Online, "Flight of an aeroplane with solid-state propulsion," Xu, et al, vol. 563 p. 532, Nov. 22, 2018, https://doi.org/10.1038/s41586-018-0707-9.
Gilmore, Christopher Kenneth, PhD thesis,"Electro-aerodynamic thrust for fixed-wing aircraft propulsion," Massachusetts Institute of Technology Feb. 2017.

* cited by examiner

*Primary Examiner* — Arun Goyal
*Assistant Examiner* — William L Breazeal
(74) *Attorney, Agent, or Firm* — Robert J. Yarbrough of Lipton, Weinberger & Husick

(57) ABSTRACT

An apparatus, system and method for generating ionosonic lift is provided. First and second control electrodes are attached in a spaced-apart relation proximal to a top surface of a wing. An alternating potential applied to the first and second control electrodes alternately attracts and repels ions of a fluid in which the wing is immersed, causing a reciprocating flow of the ions of the fluid and of neutral molecules between the first and second control electrodes. The reciprocating flow of the ions and neutral molecules causes a reduction in pressure at the top surface of the wing, resulting in net lift applied to the wing under the Bernoulli relation.

15 Claims, 13 Drawing Sheets

APPARATUS, SYSTEM AND METHOD FOR GENERATING IONOSONIC LIFT

I. BACKGROUND OF THE INVENTION

A. Field of the Invention

The Invention is an Apparatus, System and Method for generating lift by the reciprocating motion of ions of a fluid, such as air, over a surface, such as a wing. Alternating voltage and current (AC) applied to control electrodes on or above the surface of the wing causes the reciprocating motion of the ions. Movement of the reciprocating ions causes movement of neutral molecules of the fluid. Movement of the reciprocating ions and of the neutral molecules of the fluid causes a reduction in static pressure under the Bernoulli relation. The difference in static pressure above and below the wing generates lift. Lift caused by the reciprocating flow of ions and neutral molecules is referred to herein as 'ionosonic lift.' As used herein the terms 'static pressure' and 'transverse pressure' mean the pressure of the fluid transverse to the surface over which the fluid is flowing.

B. Statement of the Related Art

Ions are charged atoms or molecules. Ion thrusters have been known in the art for over a century and are used to provide thrust to spacecraft outside the atmosphere. An electrostatic ion thruster uses an electrical field to accelerate ions in a single direction through the Coulomb force. The acceleration of the ions accelerates the spacecraft in the opposite direction due to the conservation of momentum. The amount of thrust generated by the electromagnetic thruster is small, but may continue steadily for months or years, allowing the spacecraft to achieve high velocities over time. Ion thrusters also are used to maneuver satellites outside the atmosphere.

For conventional ion thrusters used in spacecraft, the materials to be ionized are selected for high mass and low ionization potential. Xenon gas has been used, as have the liquid metals cesium and indium.

For a gridded electrostatic thruster, electrons generated by a hot filament cathode or by a radio-frequency alternating magnetic field electron generator collide with atoms or molecules of the propellant in a chamber, the collisions stripping electrons from the atoms or molecules and generating positively-charged ions. The ions pass through a negatively charged grid and then a positively charged grid. The positively charged grid accelerates the ions from the thruster. Another electron generator injects electrons into the plume of ions, neutralizing the ions and preventing the ions from being attracted back to the spacecraft, which would negate the thrust.

Electrostatic propulsion that operates in the atmosphere, known as 'electro-aerodynamics,' or EAD is also known in the art. Mobile charges in the atmosphere include ions and unbound electrons. Electrostatic propulsion works by providing small or sharp electrodes, referred to as 'emitters,' separated from blunt electrodes, referred to as 'collectors.' When the electrodes are oppositely charged to a high DC voltage, nitrogen gas at the emitter is ionized to nitrogen ions that moves from the emitters to the collectors. The sharp edges of the emitters concentrate the electrical field. The moving nitrogen ions collide with neutral molecules, such as neutral nitrogen and oxygen molecules, imparting momentum to the neutral molecules. The nitrogen ions strike the oppositely-charged collectors, cancelling some of the momentum caused by the acceleration of the nitrogen ions. However, the moving neutral molecules are not attracted to the emitters or collectors and tend to pass them by. The momentum of the accelerated neutral molecules is not cancelled. The conservation of momentum results in a net thrust.

U.S. Pat. No. 3,130,945 to De Seversky issued Apr. 28, 1964 teaches a vertical takeoff and landing (VTOL) vehicle powered by electrostatic propulsion. The De Seversky vehicle includes a flat grid with sharp electrodes above the grid. Opposite DC charges are applied to the electrode and grid. Nitrogen ions are generated at the sharp electrodes and flow from the sharp electrodes to the grid. The nitrogen ions collide with other molecules in the atmosphere, which are not attracted to the grid and which flow through the grid. The result is a net thrust in the upward direction. Changing the potential applied to portions of the De Seversky electrodes and grid allows the vehicle to maneuver.

U.S. Pat. No. 10,119,527 to Krauss issued Nov. 6, 2018 teaches another VTOL vehicle powered by electrostatic thrust, very similar to De Seversky, but with an on-board power supply.

Published international PCT application 2008/016928 by Roy teaches a miniature saucer-shaped electrostatic VTOL vehicle that avoids the use of grids or sharp-edged emitters. Roy teaches that the saucer-shaped vehicle has electrodes on its top surface. The electrical field extends from the surface electrode over the surface of the vehicle to a second electrode embedded in the vehicle. Ions are generated at the surface electrode. The moving ions strike neutral molecules and result in a net thrust. Roy does not teach an alternating flow of ions or of neutral molecules and does not teach constraining the flow with an electrical or magnetic field.

The Nov. 21, 2018 online publication of Nature, vol 563 pages 532-535, includes a research letter entitle 'Flight of an aeroplane with solid-state propulsion' by Xu and others disclosing flight of a fixed wing aircraft powered by electro-aerodynamic (EAD) propulsion. The aircraft utilized a flow of ions and neutral particles in a single direction.

From the Bernoulli relation, a flow of a fluid across a surface reduces the static pressure, or transverse pressure, normal to the surface. Where the surface is a wing of an aircraft, slower moving air moves under the wing and faster moving air moves over the wing. From the Bernoulli relation, the net pressure is higher under the wing, resulting in lift. In conventional aircraft, the flow of air is in one direction—from the leading edge of the wing to the trailing edge of the wing.

The Inventor herein recognized that the Bernoulli relation applies not only to flow of a fluid in one direction but also to a reciprocating flow of a fluid. As used in this document the term 'reciprocating flow' means that the fluid moves across a surface in a first direction and then reverse to move across the surface in the opposite direction. The inventor was awarded U.S. Pat. No. 8,967,965 on Mar. 3, 2015 for 'Apparatus and Method for Orthosonic Lift by Deflection,' which relates to generating lift with relation to a support surface by mechanically reciprocating air between and largely parallel to the support surface and a wing. U.S. Pat. No. 8,967,965 is incorporated by reference as if set out in full herein.

II. BRIEF SUMMARY OF THE INVENTION

The Invention is an apparatus, system and method for utilizing the reciprocating flow of ions of a fluid across a surface of a wing to generate lift under the Bernoulli relation. As described below, the Invention utilizes electrical fields and not a mechanical apparatus to generate reciprocating flow.

As used in this document, the term 'fluid' means any liquid or gas and can include any ion of a constituent gas of the atmosphere. The remainder of this document will refer to 'air,' 'nitrogen,' 'nitrogen ions,' and 'neutral molecules.' Where this document uses the terms 'air,' 'nitrogen,' 'nitrogen ion,' and 'neutral molecule,' those terms respectively also mean 'fluid,' 'particular fluid,' 'ion of a particular fluid,' unbound electrons and 'neutral molecule of a fluid.' The reciprocating flow may be linear, circular or curved. The lift may be in the open air or may be with respect to a support surface.

The apparatus of the invention includes a wing. As used in this document, the term 'wing' means any object to which a person may wish to apply lift and is not limited to the wing of conventional aircraft. By way of example, a wing may be a conventional aircraft wing, may be a flat plate, may be a cube or other three-dimensional shape, may be curved, or may be of any other shape.

The difference in air pressure between a bottom of the wing and the top of the wing generates the lift. This document uses the terms 'top' and 'bottom,' but the wing may be oriented in any direction. This document uses the term 'lift,' but the lift is any force applied by the difference in static pressure or transverse pressure between the bottom and top of the wing in a direction determined by the orientation of the wing.

Control Electrodes

In one embodiment, the top of the wing defines a top surface and includes a first control electrode and a second control electrode on the top of the wing on or proximal to the top surface. The first control electrode may be proximal to one edge of the wing. The second control electrode may be proximal to an opposing edge of the wing. A power supply under the control of a timer applies an alternating electrical potential (AC) (also referred to herein as the 'alternating first voltage') to the first and second control electrodes so that the first and second control electrodes are of opposite alternating polarities—when the first control electrode has a positive charge and defines an anode, the second control electrode has a negative charge and defines a cathode. The polarities of the first and second control electrodes then reverse, so that the first control electrode defines a cathode and the second control electrode defines an anode.

Ions of the fluid in which the wing is immersed are propelled first toward one of the control electrodes. When the electrical potentials are reversed, the ion is propelled toward the other of the control electrodes. The result is reciprocating motion of the ions between the first and second control electrodes. The alternating electrical potential applied to the first and second electrodes has a frequency and a magnitude. The frequency and magnitude together determine how strongly the ions are propelled by the control electrodes and how far the ions travel before the polarity is reversed.

Emitter Electrode

An emitter electrode is disposed proximal to the top surface of the wing between the first and second control electrodes. The emitter electrode may be selectably actuated by the timer. When actuated, the emitter is energized to the 'emitter potential,' which is the voltage corresponding to the ionization potential of the fluid to be ionized. As an example, where the fluid is nitrogen in air, the ionization potential and hence the emitter potential applied to the emitter electrode is about +20,000 volts. Other gases have other ionization potentials. An ionization potential and hence an emitter potential may be negative.

The emitter electrode may have sharp edges and small diameters to concentrate the electrical field, as is known in the art. For the example of nitrogen in air, the energized emitter electrode pulls negatively-charged electrons from nitrogen molecules in the surrounding air, generating a multiplicity of nitrogen ions having a net positive charge. The emitter electrode and hence the nitrogen ions are proximal to the top surface of the wing. Whichever of the first and second control electrodes that is a negatively-charged cathode at the time then pulls the positively charged nitrogen ions toward that negatively-charged control electrode. Whichever of the first and second control electrodes that is positively-charged anode repels the nitrogen ions toward the negatively-charged control electrode.

Before the timer reverses the polarity of the control electrodes, the timer shuts off the he emitter electrode so that the emitter electrode is no longer electrically charged. The alternating potential applied to the control electrodes pulls the nitrogen ions alternatively toward the first control electrode and then toward the second control electrode in a reciprocating motion. As the nitrogen ions move, they collide with neutral, un-ionized molecules in the air that do not have a net electrical charge. The nitrogen ions impart momentum to the neutral molecules, impelling the net movement of the neutral molecules in the direction of movement of the nitrogen ions parallel to the surface of the wing. Because the neutral molecules do not carry a charge, they are not attracted or repelled by the first and second control electrodes.

The reciprocating motion of the nitrogen ions and neutral molecules immediately above the wing top surface causes a reduction in static air pressure to the surface of the wing under the Bernoulli relation, applying lift to the wing.

Containment Field

The movement of the nitrogen ions may be constrained to be close to the surface of the wing by electrical or magnetic containment fields. For example, containment wires carrying a positive charge may be located above the top surface of the wing. The positive electrical field surrounding the containment wires defines a containment field having a containment field polarity that repels the ions of the fluid holding the ions close to the surface of the wing. In the example above the ions are positively-charged nitrogen ions and the containment field has a positive containment field polarity. Magnets may generate magnetic fields that perform the same task, but suffer the disability of increased weight. The electrical or magnetic containment field above the top surface of the wing from the charged containment wires does not affect neutral molecules, which may move freely between the wires and toward the area of reduced air pressure generated by the reciprocating nitrogen ions. As the reciprocating ions collide with the neutral molecules, the ions may sweep the neutral molecules from the surface of the wing. The flow of neutral molecules through the containment wires and toward the area of reduced air pressure provides replacements for the neutral molecules swept from the wing and provides more neutral molecules with which the reciprocating ions will collide.

Rather than charged containment wires, the apparatus may feature a charged containment grid or other electrode array to generate a containment electrical field while allowing neutral molecules to pass through the openings between the containment wires or openings in the containment grid or other containment electrode array.

Timer and Frequency

If the reciprocating nitrogen ions actually reach a negatively-charged control electrode, the negatively-charged control electrode will neutralize the ions. Before the nitrogen ions reach the negatively-charged control electrode, the timer reverses the polarity of the control electrodes, reversing the direction of movement of the nitrogen ions. The frequency of the AC potential applied to the two control electrodes by the timer is selected based upon the distance between the two control electrodes and the speed of the nitrogen ions as the ions move through the air. The frequency is selected so that a substantial portion of the nitrogen ions will reciprocate between the two control electrodes without reaching either control electrode. The Inventor believes that frequencies of between 10 Hz and 100 kHz are suitable for the AC potential applied to the two control electrodes.

Ion Replenishment

The reciprocating nitrogen ions will degrade to neutral molecules over time or may escape the confines of the control electrodes and the containment field. The emitter electrode may be periodically energized to create additional nitrogen ions. To generate nitrogen ions in air, the emitter electrode may be positively charged and the energized emitter electrode will repel the positively charged nitrogen ions. The timer will energize the emitter electrode when the reciprocating nitrogen ions are located between emitter electrode and the control electrode that is negatively charged. The positive charge of the emitter electrode will therefore repel the nitrogen ions, including the nitrogen ions being generated by the emitter electrode, toward the negatively charged control electrode. In this manner, the emitter electrode may periodically supplement the supply of reciprocating nitrogen ions and is not energized continuously.

Control Electrode as Emitter Electrode

Alternatively, one or both of the control electrodes may serve as the emitter electrode. Periodically, a control electrode may be energized to a high potential, for example +20,000 volts, to generate nitrogen ions and to repel those ions toward the negatively-charged control electrode. The magnitude of the AC potential to one or both control electrodes may then be reduced to the potential adequate to propel the nitrogen ions in the reciprocating motion. In general, the higher the AC potential applied to the control electrodes, the greater the electrical forces acting on the nitrogen ions, the faster the nitrogen ions travel, the greater the momentum transferred to neutral molecules and the greater the lift generated.

The first and second control electrodes may be located proximal to opposing edges of the wing and the reciprocating nitrogen ions may continuously sweep neutral molecules off of the top surface of the wing and over the edges of the wing. The pumping of neutral molecules from the top of the wing may result in a lower air pressure on the top surface of the wing and a net lift on the wing.

Ion Flow Patterns

The control electrodes and timer may cause a circular or other closed curve flow of nitrogen ions on the top surface of the wing. Three or more control electrodes are disposed on the top of the wing in a spaced-apart relation to define a polygon. The timer and power supply apply a first AC potential to each of the control electrodes based on the location of the control electrode on an 'X' axis of a cartesian coordinate system and a second AC potential, overlaid on the first AC potential, to each of the electrodes based on the location of the control electrode on a 'Y' axis of the cartesian coordinate system. Each of the first and second AC potentials will have a frequency, a phase, a magnitude, and a waveform. The second AC potential may be out of phase with the first AC potential. The waveform may be a sine wave but could have other wave shapes such as sawtooth or square wave. The waveform may define variations in phase or duty cycle, such as the amount of time that the first or second AC potential is a positive value or a negative value.

The first and second AC potentials in combination may generate a circular or other closed curve movement of nitrogen ions on the surface of the wing, in the same manner that two wave forms input to the X and Y coordinates of an analogue oscilloscope generates circular patterns or other curved patterns on the oscilloscope screen. The moving nitrogen ions will collide with neutral molecules, causing the neutral molecules to move across the wing. The nitrogen ions, which may move in a circle, may result in a vortex of ions and neutral molecules above the surface of the wing. The vortex of moving ions and neutral molecules may generate lift as described above based on the Bernoulli relation. Neutral molecules with sufficient energy may evacuate the region on paths largely parallel to the wing surface and tangent to the circular patterns or other curved patterns of ion flow. The nitrogen ions may be maintained close to the surface of the wing by electrical or magnetic containment fields as described above.

Radial Flow

The apparatus may utilize a radial reciprocating flow. For a radial reciprocating flow, the second control electrode may define the perimeter of an area. The area will have a shape, which may be a disk. The second control electrode may define an array of electrodes arrayed at the perimeter of the area. The first electrode is located within the area. When the timer applies the AC potential to the first and second control electrodes, nitrogen ions reciprocate radially between the first electrode inside the area and the second control electrode at the perimeter. The reciprocating nitrogen ions collide with neutral molecules, as described above, resulting in net movement of the neutral molecules in the direction of movement of the nitrogen ions. Movement of the nitrogen ions may be constrained by an electrical field from containment wires, a containment grid, or electrode array. The radial movement of the nitrogen ions and neutral molecules results in a reduced air pressure at the surface of the wing and a net lift applied to the wing under the Bernoulli relation, all as discussed above.

The second control electrode at the periphery may comprise a plurality of second control electrodes arrayed at the periphery. One or more of the individual second control electrodes may be energized differently from the other second control electrodes, as by providing a different potential to the one or more second control electrodes, providing a biased nitrogen ion flow. The biased ion flow may provide a net thrust to the wing.

Standing Waves

The reciprocating nitrogen ions and moving neutral molecules may create standing waves of compressed air and nitrogen ions and rarefied air and nitrogen ions; that is, the reciprocating nitrogen ions may generate standing sound waves. The standing sound waves may be in a range that is inaudible. The Inventor herein has discovered that standing sound waves may generate thrust, as described in U.S. Pat. No. 10,037,752 to the Inventor herein, issued Jul. 31, 2018, which is incorporated by reference as if set forth in full herein. In this instance, the standing sound waves of the reciprocating ions may generate lift at a node, which is a location at which the nitrogen ions oscillate transversely to the direction of sound wave propagation. The wing may define an opening communicating through the wing at the node. Nitrogen ions moving in the downward direction at the node react against nothing other than air. The nitrogen ions moving in a vertical direction at the node transverse to the surface of the wing repel the positively-charged containment wire or grid, resulting in a net reaction thrust in the upward direction.

Ionosonic Grip

The wing may provide lift with respect to a support surface immediately above the wing, as described by U.S. Pat. No. 8,967,965, incorporated by reference herein. In the orthosonic grip described by that patent, a mechanical apparatus such as a conventional wire coil loudspeaker or a piezoelectric sound source provides reciprocating flow of air between a wing and a support surface generally parallel to the surface of the wing and the support surface. The difference in air pressure between the top and bottom of the wing due to the Bernoulli relation pulls the wing to the support surface As used in this document, the term 'ionosonic grip' means an apparatus that includes a wing that is pushed toward close engagement with a support surface due to the Bernoulli relation resulting from the reciprocating flow of ions between the support surface and the wing, as described above. Because the reciprocating flow of the ions is bounded by the support surface, containment wires or a containment grid are not needed. In all other respects, the Ionosonic grip operates as described above for generating lift in the open air.

III. BRIEF DESCRIPTION OF THE DRAWINGS

IV. DESCRIPTION OF AN EMBODIMENT

FIGS. 1-8 illustrate the development of the invention by the Inventor from the prior art. FIGS. 1-7 illustrate experiments performed by the Inventor relating to the Bernoulli relation, including the application of the Bernoulli relation to the reciprocating flow of a fluid 2 such as air.

Figure 1:
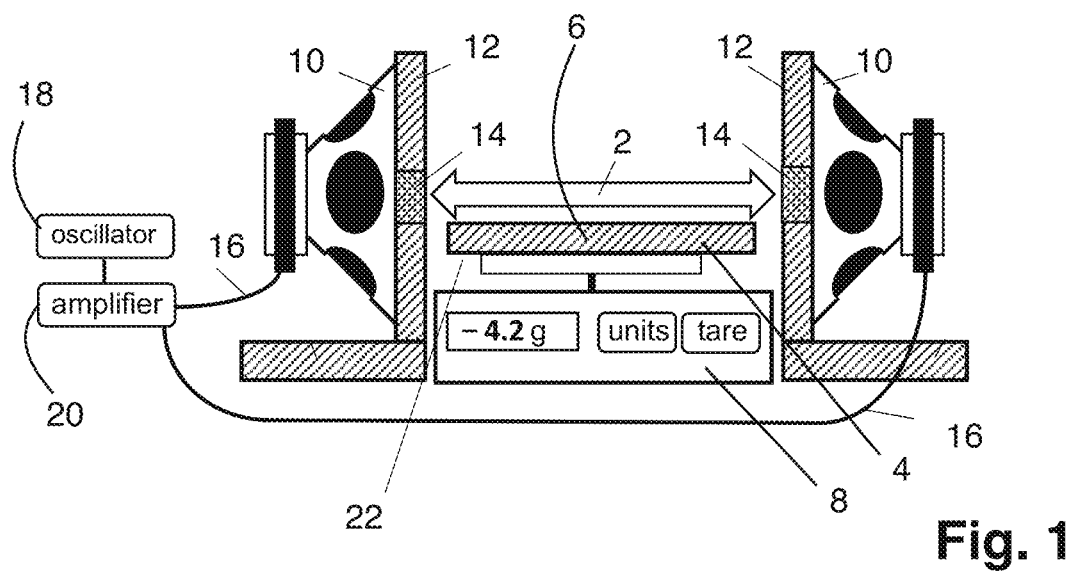
FIG. 1 is a side view of a prior art apparatus for mechanically demonstrating lift due a reciprocating flow.
Figure 2:
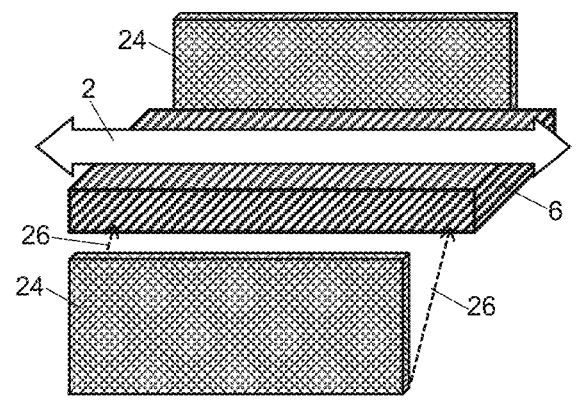
FIG. 2 is a perspective view of the apparatus of FIG. 1 improved by adding side walls to the wing.

FIGS. 1 and 2 illustrate that reciprocating flow of fluid 2 over a plate 4 will generate lift due to the Bernoulli relation. FIG. 1 shows a mechanical apparatus to generate reciprocating flow of a fluid 2 over a flat plate 4, which is the wing 6 in this instance. The wing 6 rests on a scale 8 and two mechanical loudspeakers 10 are disposed on either side of the wing 6. The loudspeakers 10 are mounted to faceplates 12 that feature openings 14 to direct the reciprocating air 2 over the surface of the wing 6. The loudspeakers 10 are connected by wires 16 out of phase to an oscillator 18 and amplifier 20 so that the left loudspeaker 10 cone advances when the right loudspeaker 10 cone retracts. The result is a reciprocating flow of air 2 over the wing 6. The reciprocating flow of the fluid 2 above the wing 6 causes a reduction in transverse air pressure above the wing 6 so that the static air 22 below the wing 6 exerts a greater force on the wing 6 than the air 22 above the wing 6, resulting in a net lift. In the experiment, the wing 6 was a flat wooden plank of 19.7 cm×5.8 cm weighting 76.2 gm. A 64 Hz sine wave at 20 watts from the oscillator 18 and amplifier 20 powered the loudspeakers 10, resulting in a reduction in the reading of the scale 8, and hence lift on the wing, of 4.2 g. The experiment and the apparatus of FIG. 1 demonstrated that reciprocating flow 2 over a wing 6 in open air generates lift, just as the flow of air 22 in a single direction over a wing 6 generates lift.

FIG. 2 is an exploded view of the wing 6 modified to include side walls 24 and shows another experiment by the Inventor based on the apparatus of FIG. 1. The side walls 24 are attached as shown by arrows 26 and laterally confine the reciprocating flow of air 2. The sidewalls were 11.5 cm×4.5 cm×0.2 cm and weighed 5 g. As before, the loudspeakers were energized out-of-phase as 64 Hz. The reading of the scale 8, and hence the lift, reduced by 7.3 g, indicating that constraining the reciprocating flow of air 2 to the surface of the wing 6 increased lift.

Figure 3:
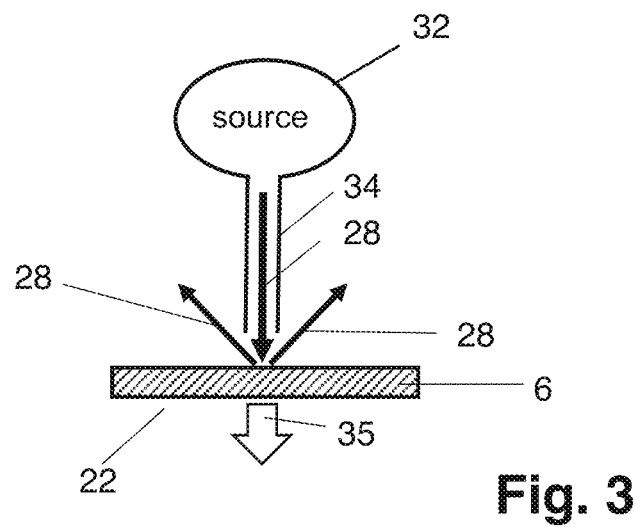
FIG. 3 is a side view of a prior art apparatus for demonstrating a response to flow that is not parallel to a wing.
Figure 4:
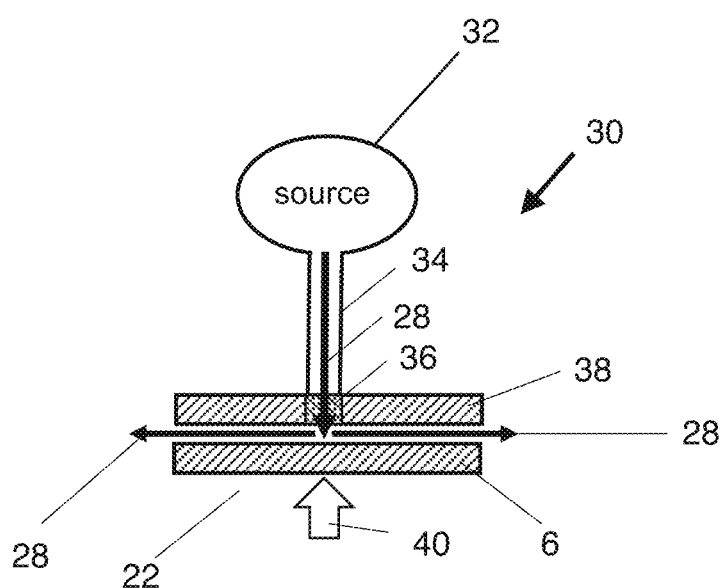
FIG. 4 is a side view of a prior art Bernoulli grip.

FIGS. 3 and 4 illustrate the operation of a prior art Bernoulli grip 30 to lift a wing 6 and demonstrate lift generated by non-reciprocating fluid flow 28; that is, by flow in a single direction. FIG. 3 shows what happens when a fluid, such as air 22, blows in an unconstrained manner against an object. In this instance, a source of air 32 propels the air 22 through a conduit 32 against the wing 6. The source of air 32 and conduit 34 may be a person blowing through a straw. The air 22 changes direction when the air 22 hits the wing 6, transferring momentum to the wing 6. The flow of air 28 applies a net force 35 pushing the wing 6 away from the conduit 34.

Contrast FIG. 4 with FIG. 3. In FIG. 4, the conduit 34 defines an opening 36 through a baffle 38. The baffle 38 in close proximity to a wing 6 that is parallel to the baffle 38. The air 22 flowing in one direction flows through the conduit 34 and changes direction when it reaches the wing 6. The air 22 then flows laterally between the wing 6 and baffle 38. The change in direction will apply force 35 from the moving air 22 to the wing 6 tending to push the wing 6 away from the baffle 38; however, the non-reciprocating flow 28 of air 22 between the baffle 38 and wing 6 results in a drop in transverse pressure normal to the wing 6 under the Bernoulli relation. Still air 22 below the wing 6 has a higher static pressure than the air 22 above the wing 6, the result is a net lift 40 holding the wing 6 in close proximity to the baffle 38. Note that the baffle 38 does not touch the wing 6 because there must be space between the wing 6 and baffle 38 for the non-reciprocating flow 28 of air 22. The apparatus of FIG. 4 is referred to as a 'Bernoulli grip' 30 and is used in industry to pick up and hold delicate workpieces.

Figure 5:
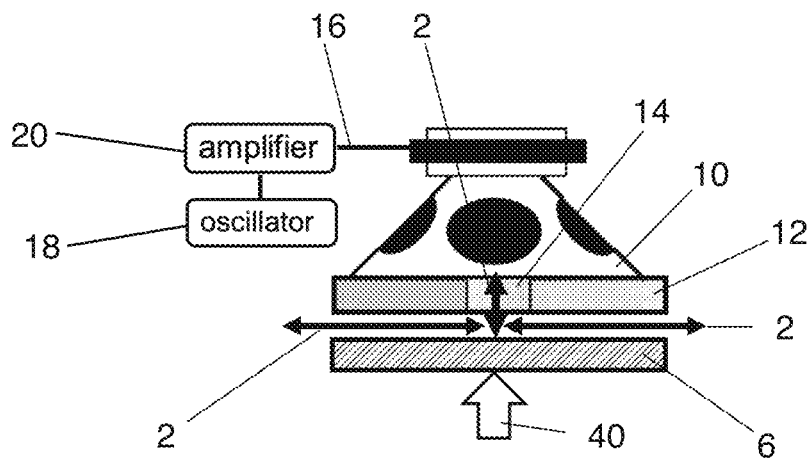
FIG. 5 is a side view of a prior art orthosonic grip.
Figure 6:
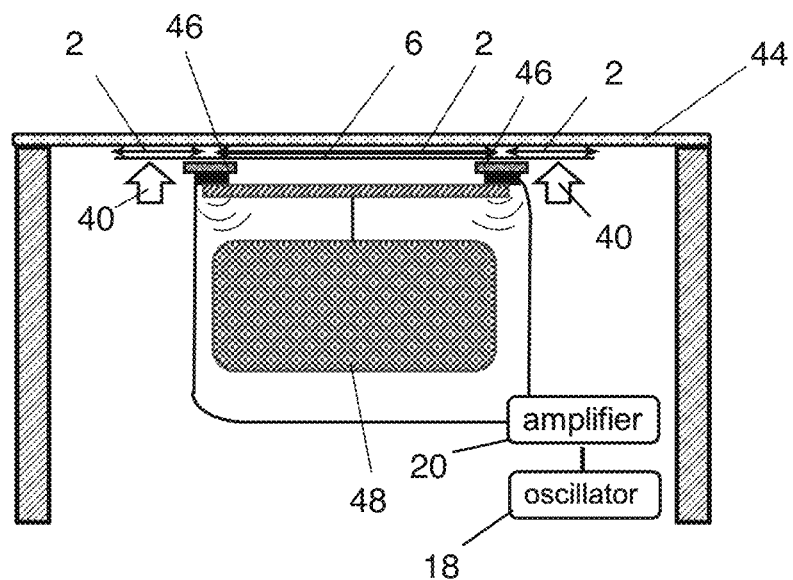
FIG. 6 is a side view of an orthosonic lift array lifting with respect to a support surface.

FIGS. 5 and 6 illustrate the operation of 'orthosonic' lift, as taught by U.S. Pat. No. 8,967,965 to the Inventor, incorporated by reference herein. FIG. 5 represents the next step beyond the Bernoulli grip 30 and is an orthosonic grip 42 supporting a wing 6. In FIG. 5, a conventional wire-wound loudspeaker 10 or other mechanical source of a reciprocating flow of air 2 is mounted to a faceplate 12 that defines an opening 14. The opening 14 of the baffle 12 corresponds to the conduit 34 of FIG. 4. When the loudspeaker 10 is actuated by an oscillator 18 and amplifier 20 over wires 16, the loudspeaker 10 causes a reciprocating flow of air 2 through the baffle 12 and between the wing 6 and the baffle 12. The reciprocating flow of air 2 results in a lower static pressure or transverse pressure above the wing 6 than below the wing 6 under the Bernoulli relation, resulting in net lift 40 pushing the wing 6 into close proximity with the baffle 12. As for the Bernoulli grip of FIG. 4, a space between the baffle 34 and wing 6 allows the movement of air 22.

FIG. 6 illustrates an experiment demonstrating orthosonic lift acting on a vibrating wing 6 flying under a support surface 44. The support surface 44 is a sheet of glass supported horizontally. The wing 6 is a thin, flat plate of T6-A1 aluminum, 30 cm×15.3 cm×0.4 cm. Two electromechanical exciters 46, Tectonic model TEAX32C30-4/B, are attached using 3M double-sided tape to the bottom side of the wing 6 so that the exciters 36 are 15.3 cm apart on the long axis of the wing 6. The exciters 46 are similar to wire-wound loudspeakers 10, but lack the basket and cone of a loudspeaker 10. The exciters 46 were activated out-of-phase by an amplifier 20 and oscillator 18, causing the wing 6 to oscillate. When the exciters 46 were activated and the wing 6 placed in close proximity to the support surface 44, the oscillation of the aluminum wing 6 drove air 22 in a reciprocating flow 2 between the locations on the top side of the wing corresponding to the two exciters 46, resulting in a drop in static pressure on the top side of the wing and a net lift 40 supporting the wing 6 in close proximity to the support surface 44. When the exciters 46 were activated at 83 Hz and 3 watts, the wing 6 was able to support a payload 48 consisting of a construction brick suspended from a wooden spar of 18 cm×2.5 cm×0.4 cm attached to the two exciters 46. The combination of the payload 48, exciters 46 and wing 6 had a mass of 2.61 kg, resulting in an aerodynamic efficiency of 8.5 N/W. To the Inventor's knowledge, an aerodynamic efficiency of 8.5 N/W is unsurpassed by any other lift-generating apparatus.

Figure 7A:
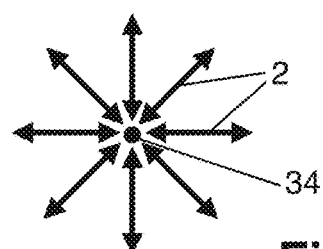
FIGS. 7A, 7B, 7C and 7D are example flow patterns for the reciprocating movement of air.
Figure 7B:
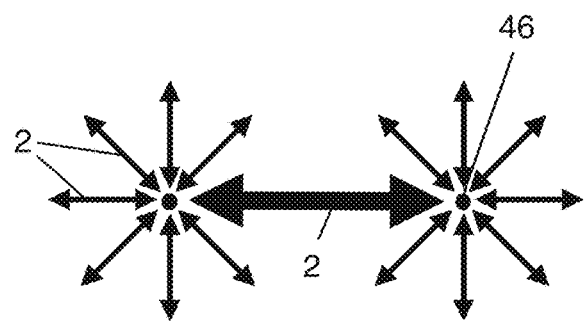
Figure 7C:
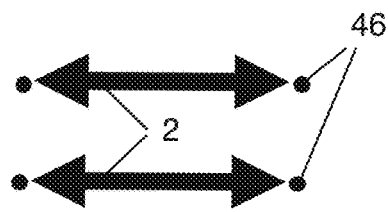
Figure 7D:
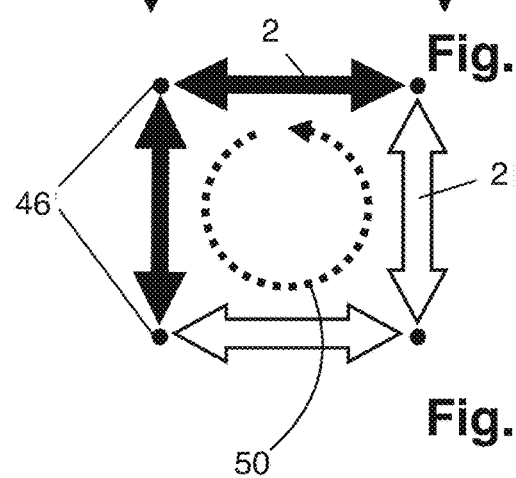

FIGS. 7A through 7D show examples of reciprocating flow patterns between a wing 6 and a support structure 40. FIG. 7A shows a radial pattern for reciprocating flow of a fluid 2 of the orthosonic grip of FIG. 5. FIG. 7B shows the reciprocating flow of a fluid 2 for the vibrating wing of FIG. 6 using two exciters 46. The reciprocating flow of fluid 2 between the locations on the wing 6 corresponding to the location of the two exciters 46 under the wing 6 is highly reinforced compared to peripheral flows. FIG. 7C shows a reciprocating flow of a fluid 2 corresponding to an array of four exciters 46 with two of the exciters 180 degrees out of phase with the other two exciters 46. The reciprocating flow of fluid 2 is as shown by FIG. 7B, but is more efficient because the lateral flow is constrained, similar to the two-sided lateral constraint of FIG. 2 above. FIG. 7D shows an array of four exciters 46 where adjacent exciters are 180 degrees out of phase, which can induce vortigenic, or circulating, flow 50.

Figure 8:
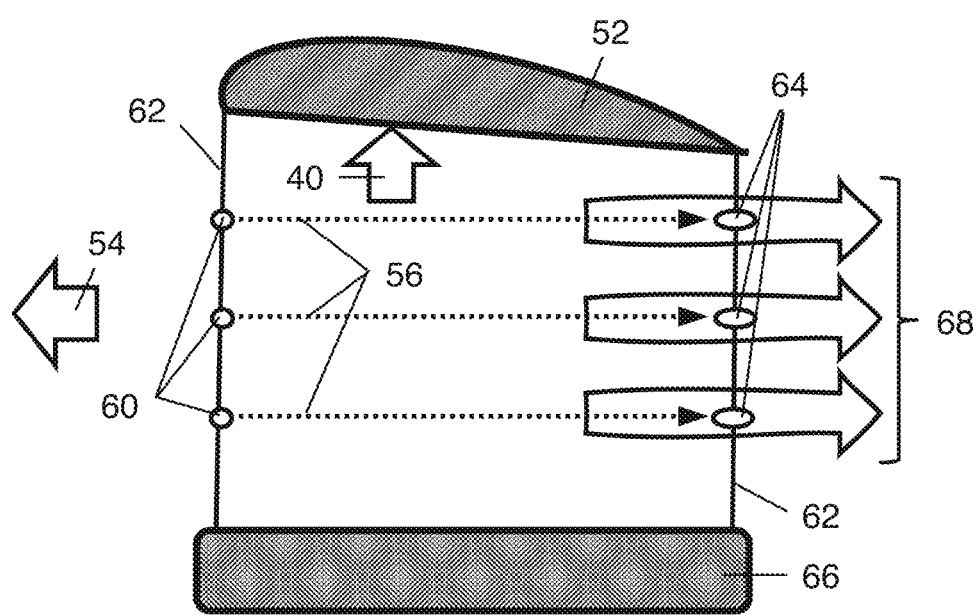
FIG. 8 is a side view of a prior art apparatus for generating thrust by the one-way flow of nitrogen ions.

FIG. 8 illustrates operation of the prior art airplane from the Xu reference described above. Xu and co-investigators demonstrated the first no-moving-parts unmanned aircraft powered by EAD. Xu derived lift by propelling a large conventional airfoil 52 (having camber and positive angle of attack) using thrust 54 in reaction to the rearward collateral flow 68 of neutral molecules accompanying an airborne nitrogen ion current 56. The nitrogen ion current 56 originates at high voltage (+20,000 V) emitting wires 60 mounted on rods 62 at the leading edge of the airfoil 52 and running the 5-meter wingspan of the aircraft. The nitrogen ion current terminates on collectors 64 (−20,000 V) located at the trailing edge of the aircraft. The nitrogen ion current 56 comprises nitrogen ions 70 and flows in one direction from the emitters 60 to the collectors 64. The nitrogen ions 70 in the nitrogen ion current 56 collide with neutral molecules such as oxygen and nitrogen and transfer momentum to the neutral molecules. The neutral molecules are not attracted to the collectors 64 and pass by the collectors 64. Thrust 54 is a reaction to the momentum of the neutral molecules propelled toward the trailing edge of the conventional airfoil 52. The collectors 64 are mounted on support rods 62 at the trailing edge. Batteries and electronics provide ballast in a fuselage 66. Though lift efficiency (at 0.11 N/W) is twenty times higher than for conventional jet aircraft, thrust density is several orders of magnitude lower.

The Xu nitrogen ions 70 are single use, terminating after one passage from the emitter 60 to the collector 64. Xu relies on constantly creating new nitrogen ions 70 and requires that the emitter 60 and collector 64 are energized at all times to generate thrust 54. Xu does not teach reciprocating flow of nitrogen ions 70 and does not teach the re-use of nitrogen ions 70. The re-use of reciprocating nitrogen ions 70 to generate lift 40 is a significant advantage of the Invention compared to EAD thrusters, such as that of Xu.

Figure 9:
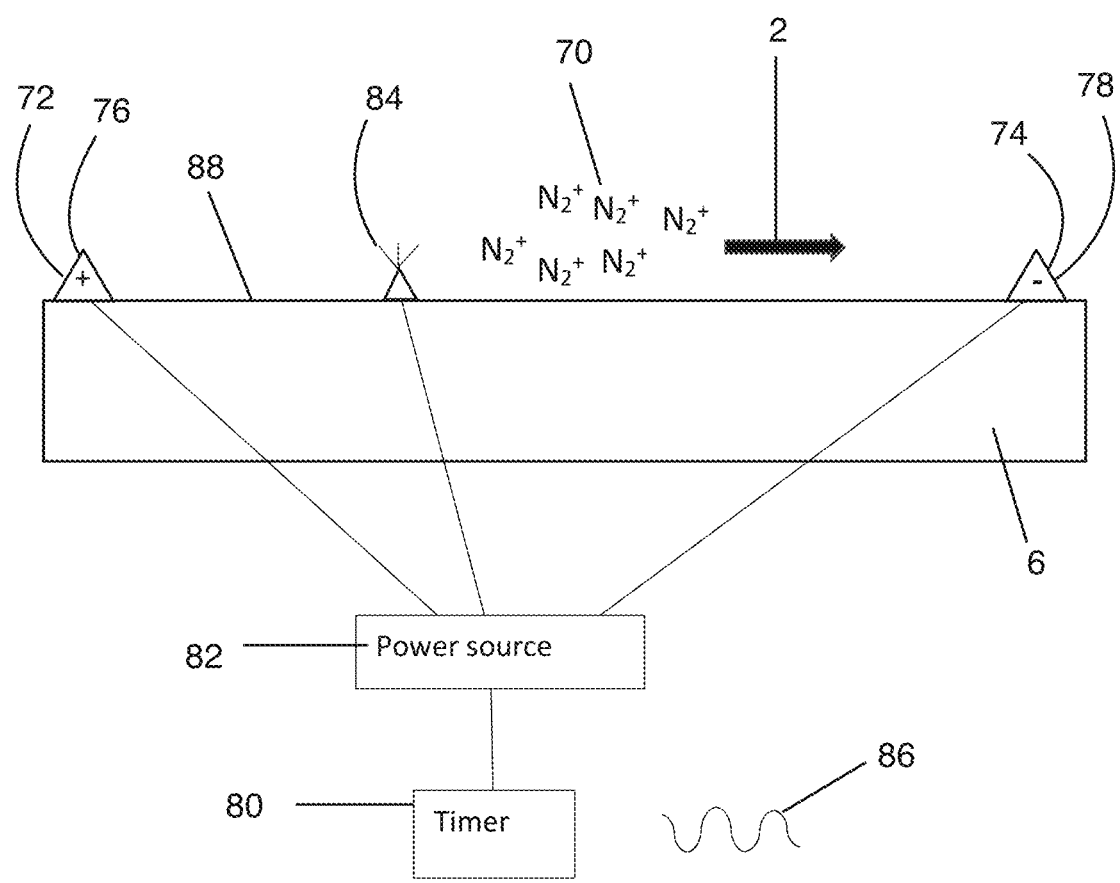
FIG. 9 is a schematic side view of the apparatus of the Invention at a first time.
Figure 10:
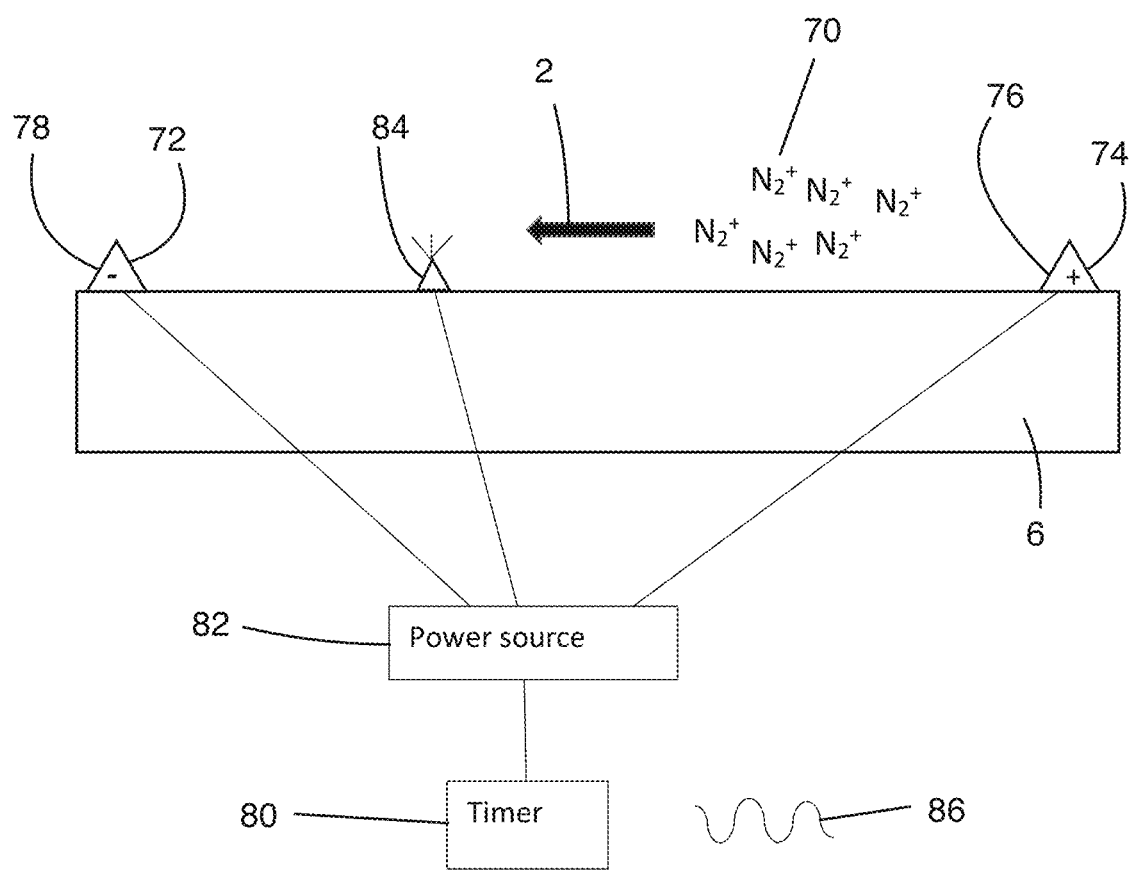
FIG. 10 is a schematic side view of the apparatus of FIG. 9 at a second time.
Figure 11:
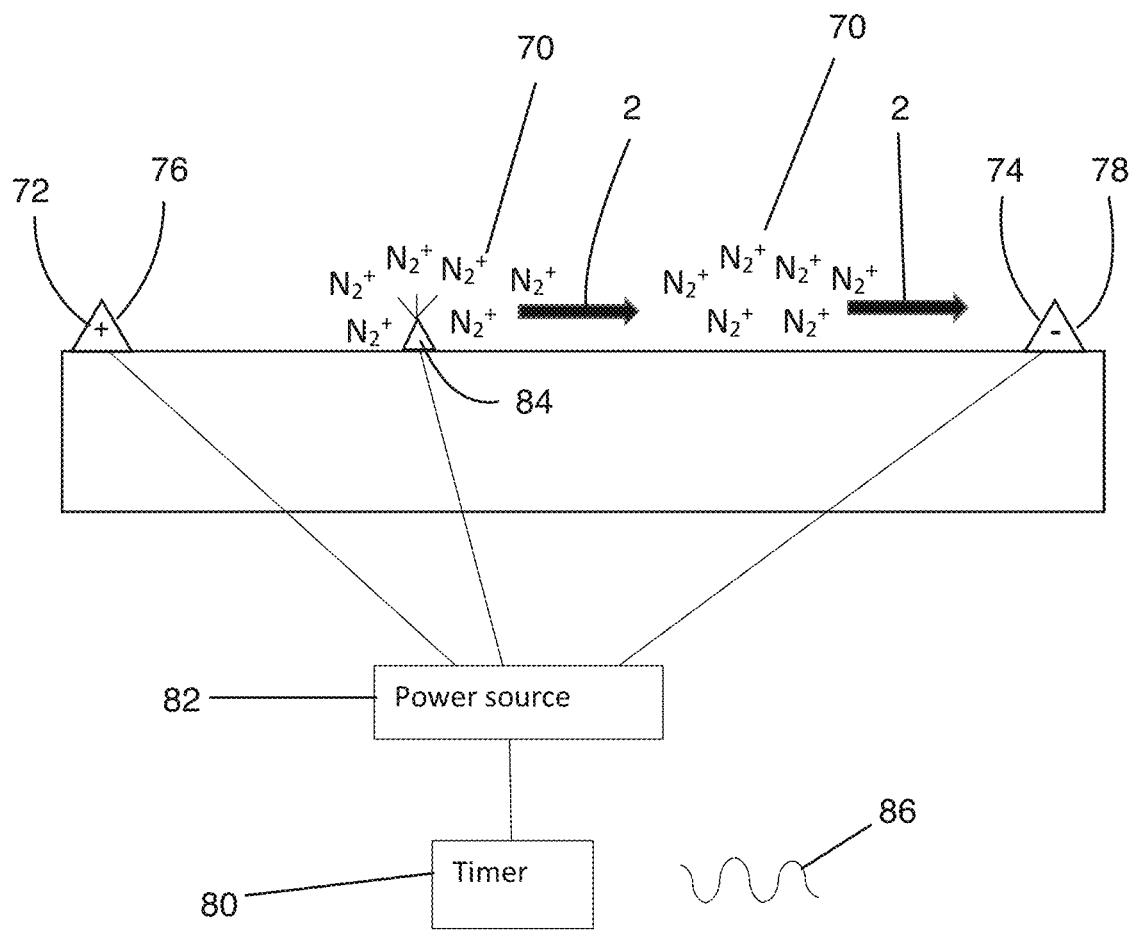
FIG. 11 illustrates the apparatus of FIGS. 9 and 10 replenishing nitrogen ions using the emitter electrode.

FIGS. 9 through 11 show an embodiment of the apparatus of the Invention. From FIG. 9, a wing 6 supports a first control electrode 72 and a second control electrode 74. The first and second control electrodes 72, 74 are alternately positively and negatively charged by a conventional power source 82 controlled by a timer 80, which may be a conventional signal generator. The alternate positive and negative charge applied to the first and second control electrodes 72, 74 defines a waveform 86 that defines a frequency. FIG. 9 shows a moment in time when the first control electrode 72 is positively charged and hence defines an anode 76. The positively-charged anode 76 repels positively-charged nitrogen ions 70 in close proximity to the top surface 88 of the wing 6. The negatively charged second control electrode 74 defines a cathode 78 and attracts the nitrogen ions 70. The nitrogen ions 70 flow (indicated by arrow 2) toward the second control electrode 74 at the moment shown by FIG. 9.

FIG. 10 shows the apparatus of FIG. 9 at a moment in time after that of FIG. 9 when the timer 80 has caused the power source 82 to reverse the polarity of the first and second control electrodes 72, 74. The first control electrode 72 is negatively charged in FIG. 10 and defines a cathode 78. The second control electrode 74 is positively charged and defines an anode 76. The positively charged second control electrode 74 repels the nitrogen ions 70 and the negatively charged first control electrode 72 attracts the nitrogen ions 70. The nitrogen ions 70 reverse direction and move toward the first control electrode 72 in a reciprocating flow 2. As described above, the nitrogen ions 70 collide with neutral molecules, such as neutral molecules of nitrogen and oxygen, transferring momentum to the neutral molecules.

The frequency of the waveform 86 of FIGS. 9 and 10 applied by the timer 80 and power supply 82 to the first and second control electrodes 72, 74 is selected so that many of the nitrogen ions 70 do not reach the cathode 78 during each half cycle of the waveform 86. The potential of the waveform 86 is selected so that the nitrogen ions 70 move with adequate energy to generate lift. The result is an energetic, reciprocating flow 2 of nitrogen ions 70 between the first and second control electrodes 72, 74.

FIG. 11 illustrates generation and replenishment of the nitrogen ions 70. As determined by the timer 80, the power supply periodically energizes the emitter electrode 84 to about +20,000 v, the ionization energy of nitrogen. The resulting nitrogen ions 70 are repelled by the emitter electrode 84 and attracted to the control electrode 72, 74 that is negatively charged at the time. FIG. 11 shows the second control electrode 74 as being negatively charged. The emitter electrode 84 is de-energized by the power supply 82 and timer 80 and the newly generated nitrogen ions 70 join the other nitrogen ions 70 in reciprocating flow 2 between the first and second control electrodes 72, 74.

Figure 12:
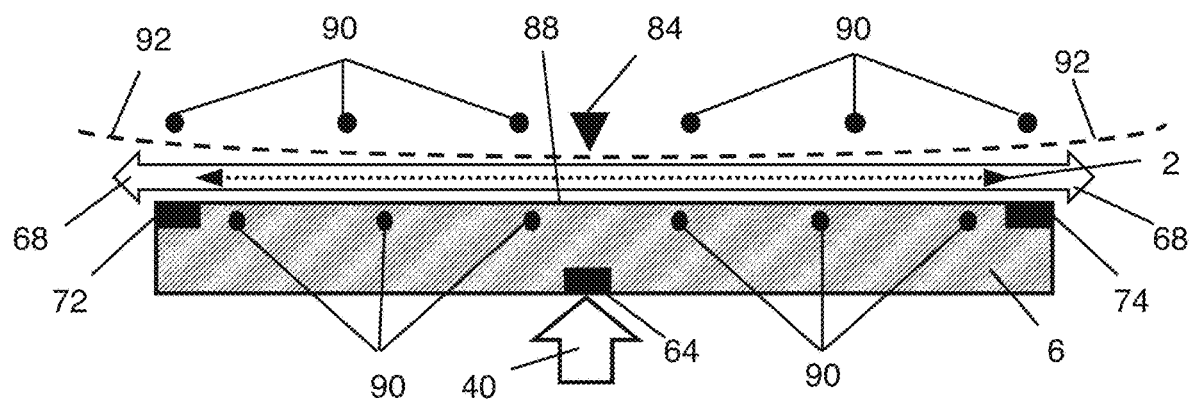
FIG. 12 is a schematic side view of the Invention utilizing an electrical containment field.

FIG. 12 is a side view of a wing 6 for ionosonic lift of the Invention, including electrical fields to constrain the reciprocating flow 2 of the nitrogen ions 70. In the example of FIG. 12, the first and second control electrodes 72, 74 are subject to alternating positive and negative electrical potentials, as described above for FIGS. 9-11, which results in reciprocating flow 2 of nitrogen ions 70 between those electrodes 72, 74. As described above, an emitter electrode 84 periodically creates additional nitrogen ions 70, which also reciprocate between the first and second control electrodes 72, 74. An array of confinement field electrodes 90 is supported by the wing 6 above the top surface 88 of the wing 6. The confinement field electrodes 90 are maintained at a positive electrical potential by the power supply 82. The confinement field electrodes 90 create a confinement field 92 that maintains the reciprocating nitrogen ions into close proximity to the top surface 88 of the wing 6, increasing the lift 40 generated and reducing the number of nitrogen ions 70 that escape the wing 6. To prevent the nitrogen ions 70 from interacting with the top surface 88 of the wing 6 and becoming neutral molecules, confinement field electrodes 90 may be disposed on or within the top surface 88 of the wing 6 to stand off the nitrogen ions 70 from the top surface 88. The underside of the wing 6 may include a nitrogen ion 70 collector 64.

Figure 13:
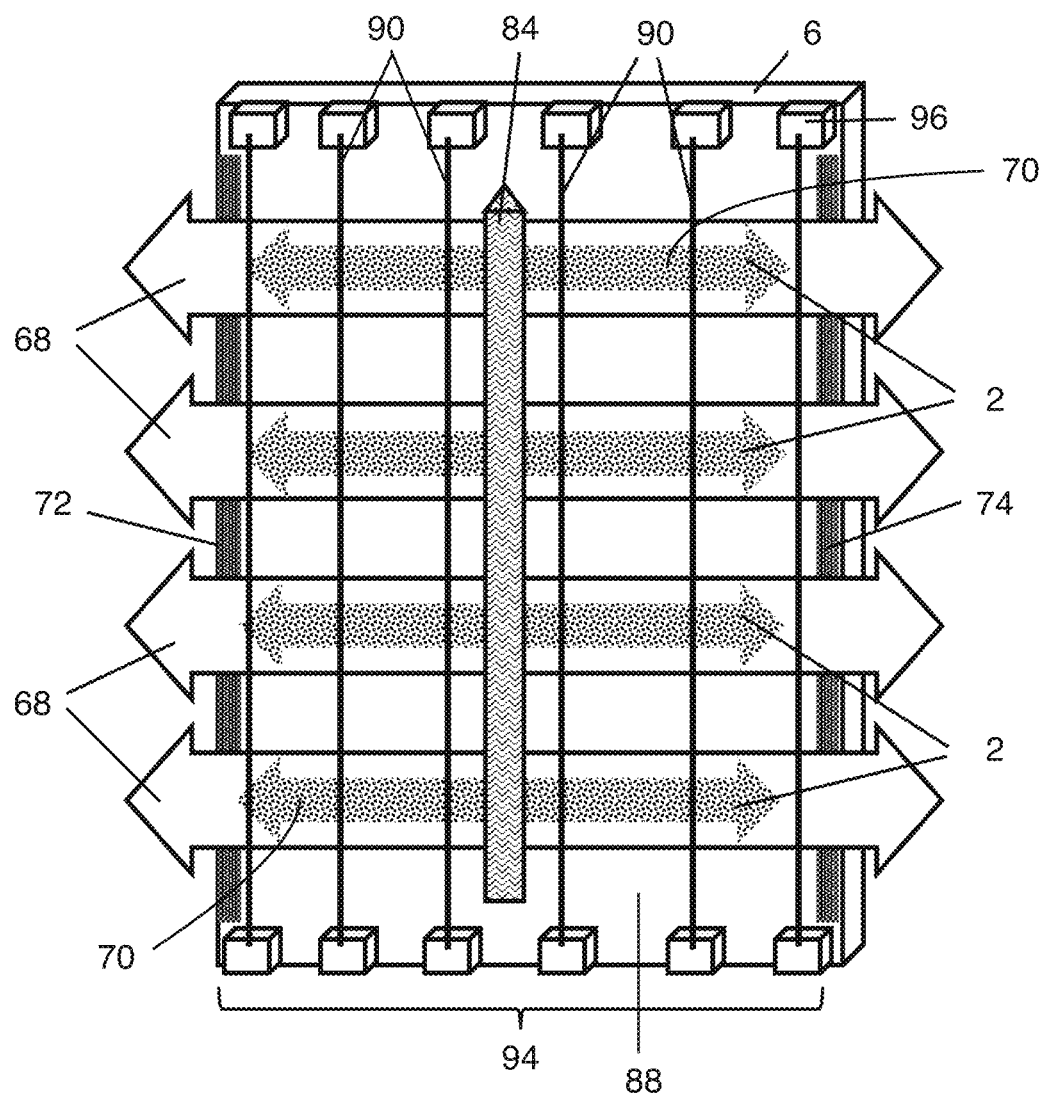
FIG. 13 is a perspective top view of the apparatus of FIG. 12.

FIG. 13 is a schematic perspective view of the wing 6 of FIG. 12. The first control electrode 72 and second control electrode 74 propel nitrogen ions 70 in a reciprocating flow 2, as described above. An emitter electrode 84 periodically creates additional nitrogen ions 70. The confinement field electrodes 90, supported by confinement field electrode supports 96 above the top surface 88 of the wing 6, maintain the reciprocating nitrogen ions 70 in close proximity to the top surface 88 of the wing 6. The reciprocating nitrogen ions 70 collide with neutral molecules of nitrogen and oxygen, imparting momentum to those neutral molecules and propelling the neutral molecules along the top surface 88 of the wing 6 to generate the collateral flow of neutral molecules 68. The reciprocating flow 2 of the nitrogen ions 70 and the collateral motion 68 of the neutral molecules proximal to the top surface 88 of the wing 6 result in a transverse pressure decrease normal to the top surface 88 under the Bernoulli relation and a net lift 40 acting on the wing 6.

The wings 6 of FIGS. 9-13 all may be flat with zero angle of attack. Unlike a conventional aircraft, the Invention does not rely on an angle of attack to generate lift 40.

Figure 14:
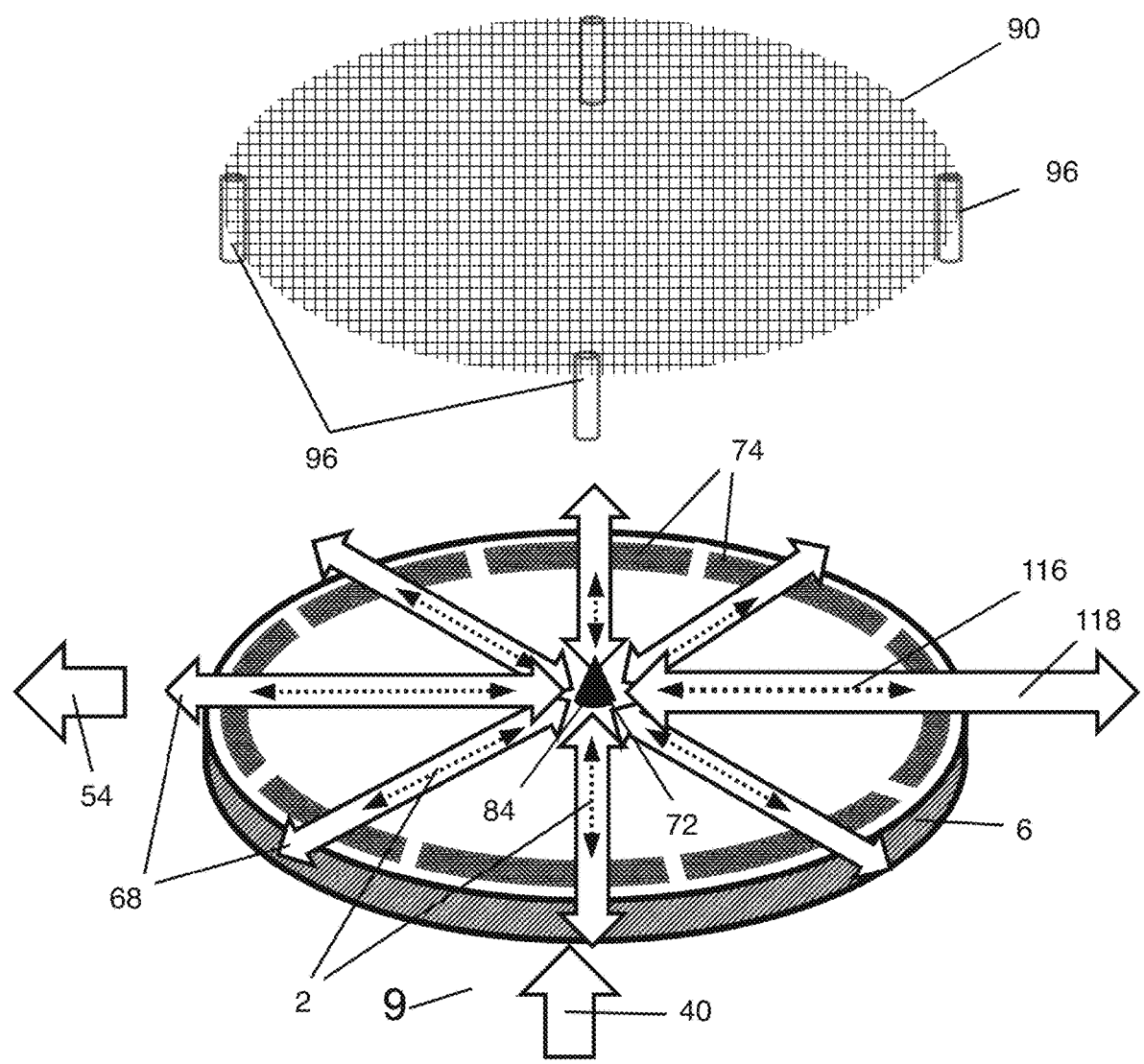
FIG. 14 is an exploded perspective view of a radial embodiment of the Invention.

FIG. 14 is an exploded view of a radial embodiment of the Invention, with the confinement field electrodes 90 and confinement field electrode supports 96 removed. The radial embodiment of FIG. 14 features a single first control electrode 72 located in the center of the wing 6. The wing 6 in this instance is disk-shaped. A plurality of second control electrodes 74 is disposed circumferentially about the perimeter of the disk-shaped wing 6. One or more of the second control electrodes 74 may be differently energized than the other second control electrodes 74. If, for example, a single second control electrode 74 is provided a different duty cycle or control potential from the other second control electrodes 74, then the single control electrode will generate a biased reciprocating flow 116 of nitrogen ions 70 and hence a biased collateral flow 118 of neutral molecules. The result may be a net thrust on the wing 6. The single first control electrode 72 may also serve as the emitter electrode 84 to generate nitrogen ions 84.

Figure 15:
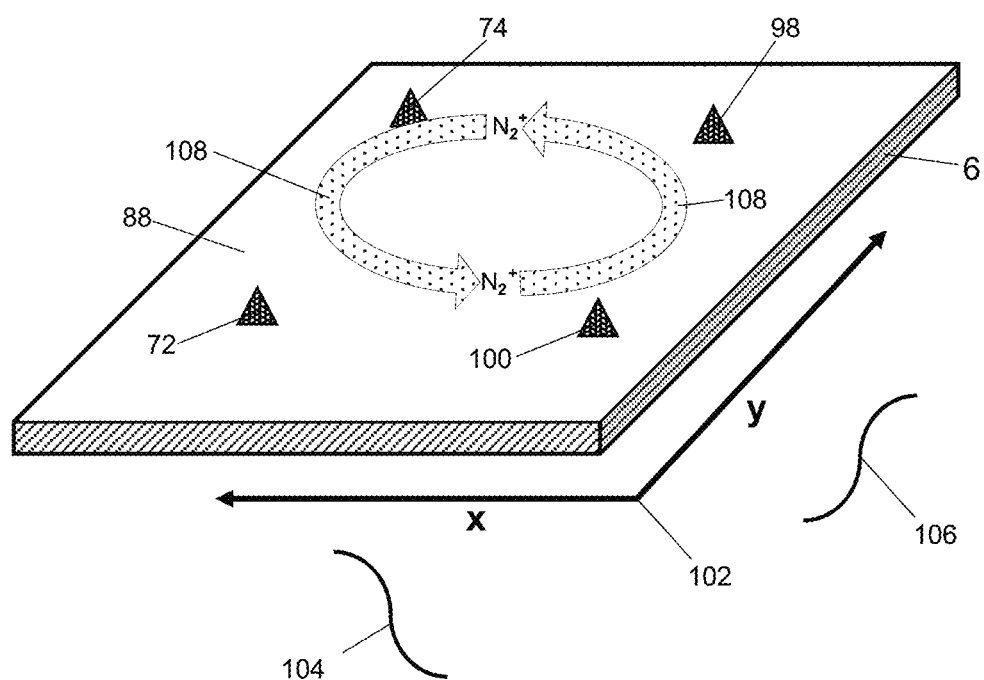
FIG. 15 is a perspective schematic view of an embodiment using four control electrodes for reciprocation in two dimensions.

FIG. 15 illustrates the use of three or more control electrodes 72, 74, 98, 100 to propel nitrogen ions 70 in a closed curve having two dimensions, rather than reciprocating in one dimension. In the example of FIG. 15, four control electrodes 72, 74, 98, 100 are disposed in a spaced-apart relation on the top surface 88 of the wing 6 and together define a polygon, in this instance a square or rectangle in a cartesian coordinate system 102. While this document refers to a cartesian coordinate system 102, any other coordinate system that allows description of waveforms 86 in time and space is suitable and contemplated by the invention. In the example, of FIG. 15, the timer 80 and power supply 82 of FIGS. 9-11 apply a first waveform 104 to the four control electrodes 72, 74, 98, 100 based on the location of each electrode on the X-axis of the coordinate system 102. The timer 80 and power supply 83 also apply a second wave form 106 to each of the four control electrodes 72, 74, 98, 100 based on the location of each electrode on the Y-axis of the coordinate system 102. The combination may cause the nitrogen ions 70 to reciprocate in two dimensions and to describe a closed curve 108, in this instance a circular or oval closed curve 108. The nitrogen ions 70 traveling in a closed curve 108 may create one or more vortices, increasing the generated lift 40.

Figure 16:
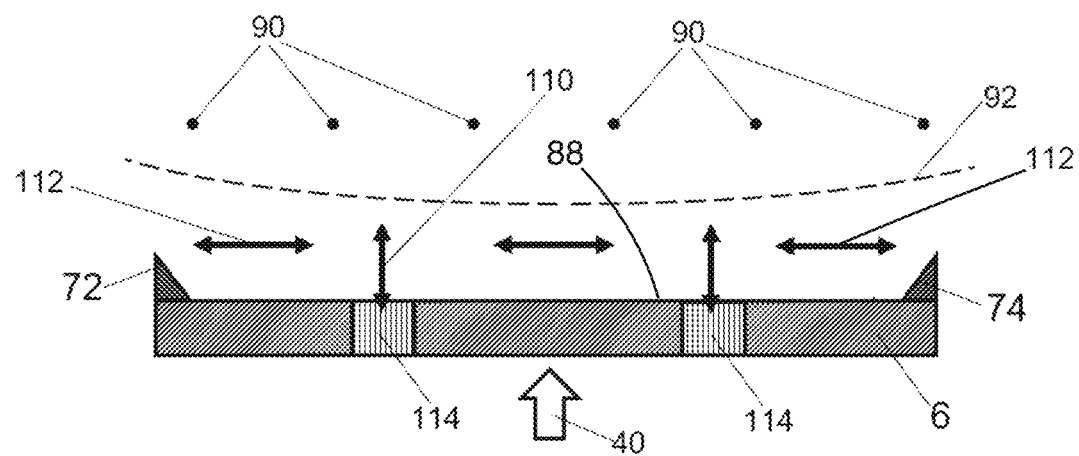
FIG. 16 is a side view of an embodiment utilizing acoustic standing waves to generate lift.

FIG. 16 illustrates the creation of standing sound waves above the top surface 88 of the wing 6 due to the reciprocating nitrogen ions 70 and resulting collateral flow of neutral molecules 68. The standing sound waves may occur when the distance between the control electrodes 72, 74 is a multiple of the wave length of the waveform 86 applied to the control electrodes 72, 74. When standing waves occur, the standing waves have antinodes 112 at which the nitrogen ions 70 will oscillate in the direction of wave propagation and nodes 110 at which the nitrogen ions 70 will oscillated normal to the direction of wave propagation. The wing 6 may be equipped with wing openings 114 communicating through the wing from the top surface 88 to the bottom at the nodes 110. The oscillation of the nitrogen ions 70 at the node 110 in the downward direction will react against air 22. The oscillation of the nitrogen ions in the upward direction will react against the containment field 92, resulting in a net lift 40 to the wing 6.

Any of the features of any of the embodiments of the Invention described herein may be applied to any other embodiment. Similar features described for one embodiment or for one figure apply equally to features having a same or similar name or element number in another embodiment or another figure.

LIST OF ELEMENTS

The following numbered elements appear in the specification and drawings.
2 Reciprocating flow of a fluid
4 Plate
6 wing
8 scale
10 mechanical loudspeaker
12 faceplate
14 opening
16 wires
18 oscillator
20 amplifier
22 air
24 side wall
26 Arrow
28 non-reciprocating fluid flow
30 Bernoulli grip
32 source of fluid, such as air
34 conduit
35 net force pushing the wing 6
36 opening through a baffle
38 baffle
40 lift
42 orthosonic grip
44 support surface
46 exciters
48 payload
50 circulating flow
52 conventional airfoil
54 thrust
56 nitrogen ion current
60 emitting wire
62 rods
64 collectors
66 fuselage
68 collateral flow of neutral molecules
70 nitrogen ions
72 first control electrode
74 second control electrode
76 anode
78 cathode
80 timer
82 power source
84 emitter electrode
86 waveform
88 top surface of the wing
90 confinement field electrodes
92 confinement field
94 confinement field electrode array
96 confinement field electrode support
98 third control electrode
100 fourth control electrode
102 cartesian coordinate system
104 first wave form
106 second wave form
108 closed curve
110 node
112 antinode
114 wing opening
116 biased reciprocating flow of nitrogen ions
118 biased collateral flow of neutral molecules

I claim:

1. An apparatus for electrically generating a net lift, the apparatus comprising:
a) a wing having a top and a bottom, the top of the wing defining a top surface, the wing being immersible in a fluid;
b) a first control electrode and a second control electrode, the first control electrode and the second control electrode being located at the top of the wing proximal to the top surface of the wing, the first control electrode and the second control electrode being separated by a distance;
c) a power supply configured to apply an alternating first voltage between the first control electrode and the second control electrode,
wherein a frequency of the first voltage its is controlled by a timer, and
wherein the timer is configured to control the frequency of the first voltage when the wing is immersed in the fluid such that a multiplicity of ions of the fluid reciprocate between the first control electrode and the second control electrode during each full cycle of the first voltage at the frequency, and
wherein the timer is further configured to control the frequency of the first voltage such that an adequate portion of the multiplicity of ions do not reach either the first control electrode or the second control electrode during any half cycle of the first voltage at the frequency so as to apply the net lift to the wing.

2. The apparatus of claim 1, the apparatus further comprising: an emitter electrode, the emitter electrode being disposed between the first control electrode and the second control electrode and proximal to the top surface of the wing, the emitter electrode being selectably energized by an emitter potential, whereby when the emitter electrode is energized to the emitter potential and the wing is immersed in the fluid the multiplicity of ions of the fluid is generated at the emitter electrode.

3. The apparatus of claim 1 wherein a one or both of the first control electrode and the second control electrode is configured to be selectably energized to an emitter potential so that when the wing is immersed in the fluid and the one or both of the first control electrode and the second control electrode are energized to the emitter potential the multiplicity of ions of the fluid is generated at the one or both of the first control electrode and the second control electrode.

4. The apparatus of claim 1, the apparatus further comprising: a containment field generator located above the top surface of the wing, the containment field generator being configured to generate a containment field having a containment field polarity, the containment field polarity being selected so that the containment field repels an ion among the multiplicity of ions, the containment field generator distributing the containment field between the first control electrode and the second control electrode, whereby the containment field urges the ion among the multiplicity of ions toward the top surface of the wing when the ion among the multiplicity of ions is reciprocating between the first control electrode and second control electrode.

5. The apparatus of claim 4 wherein the containment field is an electrical containment field, the containment field generator comprising: an electrical conductor, the electrical conductor defining openings so that the fluid may pass through the electrical conductor.

6. The apparatus of claim 5 wherein the electrical conductor is defined by a plurality of wires or a grid supported by the wing above the top of the wing.

7. The apparatus of claim 2 wherein the fluid is air and an ion of the multiplicity of ions is a nitrogen ion and the emitter potential is selected to be above an ionization potential of a neutral nitrogen gas, whereby the emitter electrode when energized to the emitter potential will generate a multiplicity of the nitrogen ions.

8. The apparatus of claim 1, the apparatus further comprising an emitter electrode, the emitter electrode being disposed proximal to the top surface of the wing, the emitter electrode being selectably energized to an emitter potential, whereby when the emitter electrode is energized to the emitter potential and the wing is immersed in the fluid the multiplicity of ions is generated at the emitter electrode, wherein the timer is operably attached to the emitter electrode and configured to selectably energize the emitter electrode to the emitter potential.

9. The apparatus of claim 8 wherein the emitter electrode is disposed between the first control electrode and second control control electrode.

10. The apparatus of claim 8 wherein the first or the second control electrode defines the emitter electrode.

11. The apparatus of claim 1 wherein the second control electrode is disposed about a perimeter of an area, the area having a shape, the second control electrode not being disposed within the perimeter of the area, and wherein the first control electrode is located within the perimeter of the area, whereby the multiplicity of ions of the fluid reciprocates radially between the first control electrode and the second control electrode.

12. The apparatus of claim 11 wherein the shape is a disk.

13. The apparatus of claim 1, the apparatus further comprising: a containment field generator located above the top surface of the wing, the containment field generator being configured to generate a containment field having a containment field polarity, the containment field polarity being selected so that the containment field repels an ion among the multiplicity of ions, wherein the frequency is selected so that the ion among the multiplicity of ions may travel one half the distance between the first control electrode and the second control electrode or less during each half cycle to create one or more standing acoustical waves between the first control electrode and second control electrode, the one or more standing acoustical waves defining one or more antinodes at which the multiplicity of ions of the fluid move generally normal to the surface of the wing, the wing defining one or more openings communicating between the top and the bottom of the wing, a location of each opening of the one or more openings corresponding to a location of one of the antinodes of the one or more antinodes, whereby the ion among the multiplicity of ions at the antinode produces lift by reaction with the containment field.

14. The apparatus of claim 1 wherein the top surface of the wing is disposed proximal to a support surface so that the multiplicity of ions of the fluid reciprocate between the first control electrode and the second control electrode while bounded by the top surface of the wing and the support surface, whereby a pressure difference between the bottom and top of the wing urges the wing into close proximity to the support surface.

15. An apparatus for electrically generating lift, the apparatus comprising:
   a) a wing, the wing having a top and a bottom, the top of the wing defining a top surface, the wing being immersible in a fluid;
   b) a plurality of control electrodes, the plurality of control electrodes being located on the top of the wing proximal to the top surface of the wing, each control electrode of the plurality of control electrodes being in a spaced-apart relation to define a polygon in a cartesian coordinate system, a respective location of each control electrode of the plurality of control electrodes having a respective position on an X-axis of the cartesian coordinate system and a respective position on a Y-axis of the cartesian coordinate system;
   c) a power supply configured to apply a first alternating electrical potential to each control electrode of the plurality of control electrodes based on the respective position of each control electrode of the plurality of control electrodes on the X-axis of the cartesian coordinate system, the power supply being configured to simultaneously apply a second alternating electrical potential to each control electrode of the plurality of control electrodes based upon the respective position of each control electrode of the plurality of control electrodes on the Y-axis of the cartesian coordinate system, each alternating electrical potential of the first alternating electrical potential and the second alternating electrical potential having a respective frequency and a respective phase, each respective frequency and each respective phase being selected so that when the wing is immersed in a fluid and an ion of the fluid is located proximal to the plurality of control electrodes, the plurality of control electrodes propels the ion of the fluid along a path defined by a closed curve.

* * * * *